United States Patent [19]

Moore

[11] Patent Number: 4,881,487
[45] Date of Patent: Nov. 21, 1989

[54] FLUID LEVEL SENSING METHOD AND APPARATUS

[75] Inventor: Scott E. Moore, Boise, Id.
[73] Assignee: Micron Technology Inc., Boise, Id.
[21] Appl. No.: 273,580
[22] Filed: Nov. 21, 1988
[51] Int. Cl.[4] ............. B65B 3/04; G01N 21/27; G01N 1/10
[52] U.S. Cl. .................... 116/227; 55/18; 55/274; 73/293; 141/65; 141/95; 222/23; 250/577
[58] Field of Search .............. 73/293; 250/577; 141/65, 94, 95, 23; 222/468, 464; 137/399; 55/274, 18; 210/94; 116/227

[56] References Cited

U.S. PATENT DOCUMENTS

| | | | |
|---|---|---|---|
| 3,269,609 | 8/1966 | Ahrens | 222/464 X |
| 3,894,240 | 7/1975 | Rose | 250/577 |
| 4,311,492 | 1/1982 | Eltvedt | 222/464 X |
| 4,399,711 | 8/1983 | Klein | 250/577 X |
| 4,410,020 | 10/1983 | Lorenz | 250/577 X |
| 4,756,348 | 7/1988 | Moller | 141/65 X |

FOREIGN PATENT DOCUMENTS 0995252 6/1965 United Kingdom ............... 250/577

*Primary Examiner*—Daniel M. Yasich
*Attorney, Agent, or Firm*—Jon P. Busack; Stan Protigal

[57] ABSTRACT

A fluid level sensor is provided in a fluid dispensing system, primarily in a photoresist dispensing system used in a semiconductor manufacturing process. A bubble is introduced into the fluid shortly before fluid supply is emptied, said bubble being used to detect a low fluid level. The invention uses a snap-on combination cap and pickup tube, the pickup tube having a small hole near its lower tip, and the cap containing an optical bubble detector.

10 Claims, 4 Drawing Sheets 4,881,487

FLUID LEVEL SENSING METHOD AND APPARATUS

FIELD OF THE INVENTION

This invention generally relates to level sensing in fluid dispensing systems, particularly within a supply bottle of an automatic photoresist or primer dispensing system used in a semiconductor manufacturing process.

BACKGROUND OF THE INVENTION

Photoresist is a type of liquid chemical that is crucial in the manufacture of semiconductors. Used with photolithography techniques, photoresist facilitates patterning and construction of semiconductor devices on a silicon wafer.

In a semiconductor manufacturing process, photoresist primer is uniformly distributed on a wafer surface, then spun off. The primer cleans the wafer and prepares the wafer to readily adhere to photoresist, said photoresist then being uniformly distributed on the wafer. Then a pattern is flashed onto the photoresist by a specific wavelength light source shining through a mask. The photoresist is reactive to the wavelength, so areas of the photoresist harden, depending on exposure or non-exposure to the light. Subsequent removal of the non-hardened photoresist reveals a pattern of photoresist voids on the wafer that matches the mask that the light shone through. A processing step is then done, the newly formed voids allowing processing only on the exposed silicon. The rest of the photoresist is then stripped off. This pattern and process cycle is repeated with different masks to build desired structures in and on the silicon wafer.

The primer and photoresist step is repeated many times in a semiconductor process, so any small improvements can return big gains in yields, quality, and profits.

Photoresist is expensive, so waste must be minimized. This means that a supply bottle must be drained as much as possible without introducing gas voids into the dispensing system. Gas voids can disable the fluid pump, and bubbles deposited onto the wafer cause spurious voids in the photoresist pattern, which result in a misprocessed wafer.

Particles and foreign elements deposited onto the wafer can also cause mispatterning, so a photoresist dispensing system must also be as clean as possible, and non-reactive with the fluid dispensed.

A wafer damaged because of dispensing malfunction is money lost, so a dispensing system with reliability improvements is favored.

A dispensing system with maintenance improvements, such as quick and inexpensive replacement, is also favored.

SUMMARY OF THE INVENTION

According to the present invention, a level of a fluid which is being pumped out of a bottle is sensed by generating a bubble in a pickup tube within the bottle shortly before the bottle is emptied, and subsequently detecting the bubble.

The preferred embodiment that accomplishes this is a level sensing fluid extraction bottle cap primarily for use in a fluid dispensing system, said system providing a pump that dispenses fluid from the bottle through said cap, an electronic pump controller, and associated fluid connections. Cap level sense means signals the controller to stop the pump, interlock other equipment, and warn the operator when the bottle is practically empty, just before any gas voids are pumped into the fluid connections.

The novel level sense means comprises optical bubble detection means within the cap, aimed across a non-opaque outlet tube. The outlet tube attaches to a pickup tube which extends to a bottom-most corner of the bottle, the bottle being tilted to facilitate fluid pickup. Very near the bottom end of the pickup tube is a small aperture, called a bubble hole. When the fluid level drops below the bubble hole but still remains above the bottom end of the pickup tube, a small bubble is pulled into the pickup tube and passes by the optical detector in the cap, which detects the distinguishing optical properties of the bubble. Upon detection, the optical detector signals the pump controller to stop pumping. This simple level sense arrangement has no moving parts, and the detection means is isolated from the fluid, contributing to higher reliability.

Fluid is allowed to pass only through chemically inert tubing, threadlessly sealed. Thus the cleanliness of the apparatus is improved.

The cap itself snaps onto the bottle instead of being twisted on, offering more efficient maintenance.

Other features of this cap, not necessarily novel, are pump venting return and back fill means.

DETAILED DESCRIPTION OF THE PREFERRED EMBODIMENT

Figure 1:
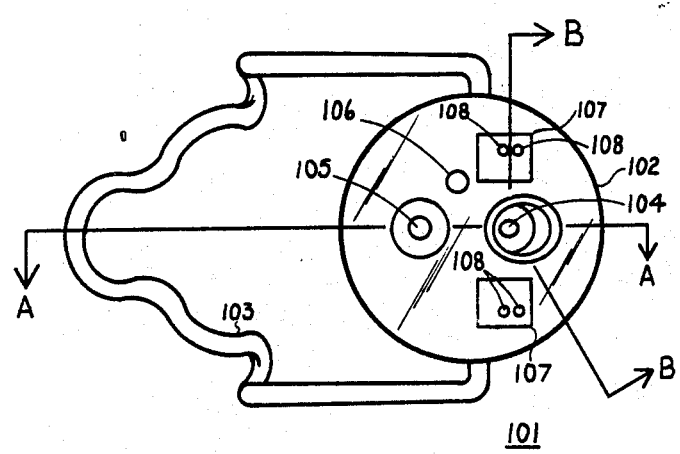
FIG. 1 is a top view of the cap body and clamp.
Figure 2:
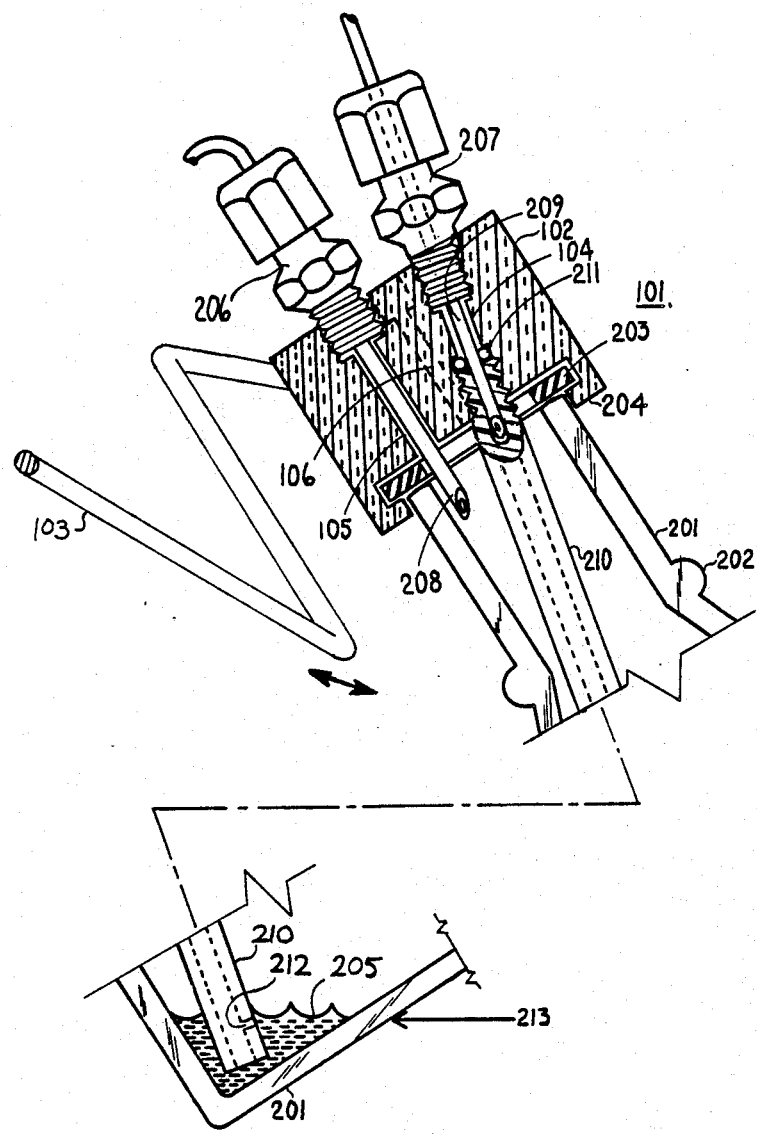
FIG. 2 details a cross section along line A—A of FIG. 1, also showing items such as tubing, bottle, and fittings.
Figure 3:
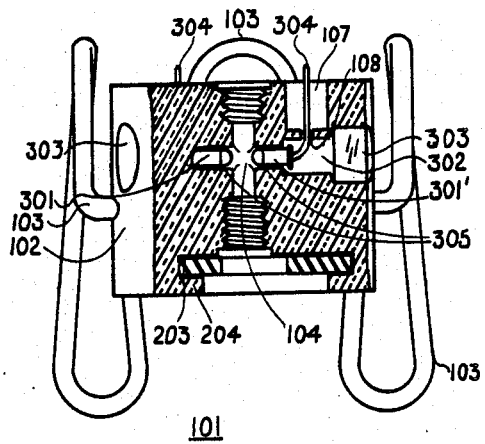
FIG. 3 details the cross section along broken line B—B of FIG. 1, showing optical pair arrangement.

A level sensing chemical extraction bottle cap 101, shown in FIGS. 1, 2, and 3, primarily includes a cap body 102 which contains an optical sensor (which includes an emitter 301 and a detector 301') and is attached to a pickup tube 210, the tube 210 having a bubble hole 212 near its bottom end. A gripper 103, made of thick resilient wire, is rotatably connected to the body 102 so that the apparatus 101 can be clamped onto a bottle 201 mouth and is configured to grip a feature 202, such as a ridge or ridge-like structure, on bottle 201.

A lower perimeter 204 of the cap body 102 is formed to hold a resilient washer 203. When the cap 101 is clamped onto the bottle 201 mouth, the washer 203 is squeezed between the cap body 102 and the bottle 201, providing a seal. In practice, the gripper 102 ends are mounted in metal bushings (not shown) in the cap body 102 to avid causing deformation of the cap body 102 by the gripper 103 ends during the attachment.

The cap body 102 contains an outlet channel 104, a backfill channel 105, and a vent channel 106. A backfill fitting 206 anchors a backfill tube 208 so that an end of the backfill tube 208 extends through the backfill channel 105 into the bottle 201. An outlet fitting 207 anchors a substantially non-opaque outlet tube 209 in the outlet channel 104, the tube 209 passing between emitter 301 and detector 301'. An end of the outlet tube 209 is held in the pickup tube 210 upper end. Said fittings 206 and 207 also provide strain relief for tubes 208 and 209.

Figure 4:
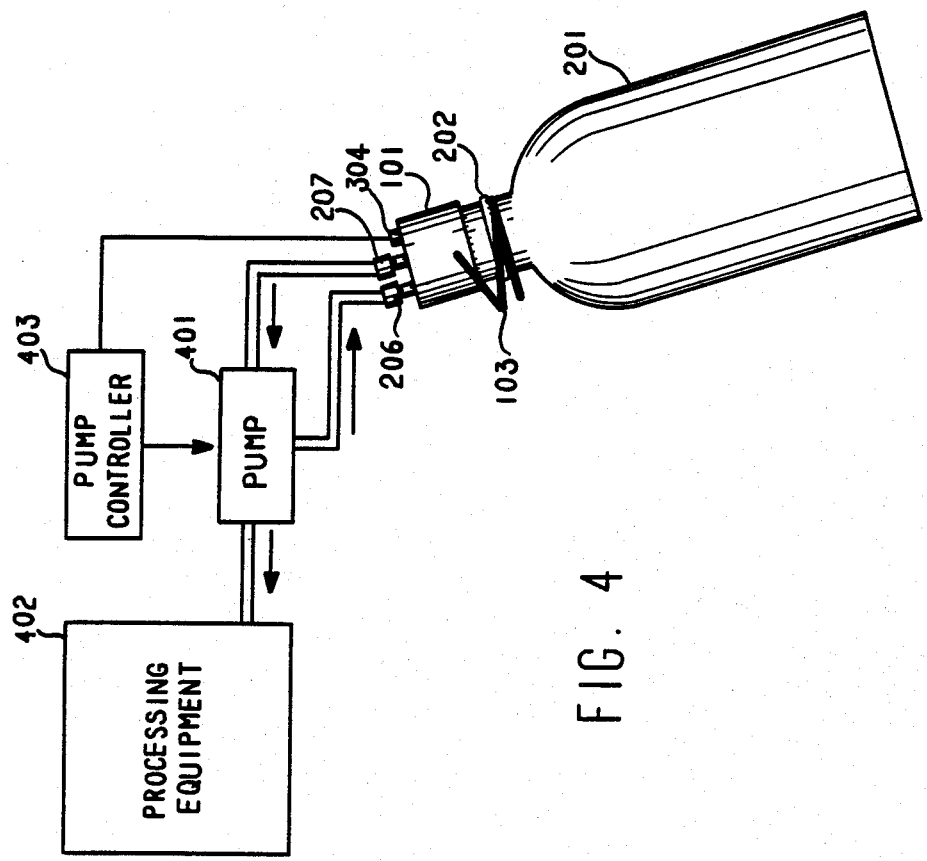
FIG. 4 illustrates the preferred embodiment used in a system.

Within the cap body 102, emitter 301 and detector 301' are seated in optical cavities 302 and sealed in by plugs 303. Emitter 301 and detector 301' have electrodes 304 extending through electrode holes 108 into electrode cavities 1067. Electrodes 304 are keyed to prohibit cross wiring, and during use are connected to pump controlling means 403 (shown in FIG. 4) which powers emitter 301 and detector 301' and receives a signal from detector 301'. Emitter 301 and detector 301' optically communicate through an optical channel 305 across outlet tube 209. The working wavelength of emitter 301 and detector 301' is different from any reactive wavelength of fluid 205.

The pickup tube 210 extends to a bottom-most corner of the bottle 201, the bottle 201 being tilted to facilitate fluid pickup.

In operation, as fluid 205 is pumped out of the bottle 201 through pickup tube 210 and outlet tube 209, fluid level 213 declines. Fluid 205 thus passing out of bottle 201 through outlet tube 209 between emitter 301 and detector 301' has a uniform consistency, causing a non-varying electrical signal to be generated by detector 301'. During pumping, when fluid level 213 passes below bubble hole 212, a small bubble is pulled into a pickup tube 210 through bubble hole 212, pulled up pickup tube 210 and into outlet tube 209, and passes between emitter 301 and detector 301', causing a variation in the detector 301' signal. This variation in signal is detected by pump controlling means 403 connected to electrodes 304 for purposes of stopping pump 401 when fluid level 213 is pumped past the level of bubble hole 212. The bubble so generated is small enough to be vented in pump 401 and therefore does not cause spurious voids in fluid subsequently deposited on a wafer. Practically all fluid 205 is pumped out of bottle 201.

An O-ring 211 forms a threadless seal between the pickup tube 210 and the outlet tube 209, said seal providing improved cleanliness of the apparatus. Also, all elements that contact the fluid are made of non-shedding non-reactive materials such as Teflon or stainless steel, or like chemically inert material, to avoid introducing particles and chemical impurities into the fluid and to avoid changes in the elements that might be caused by the fluid.

Because the apparatus has no moving parts and simple design, reliability is enhanced.

The snap-on ability of the cap coupled with inexpensive and simple construction make the invention favorable from a maintenance perspective.

Clearly, the disclosed apparatus can be widely varied without stepping outside the scope of the claims. The gripper could be a threaded or notched twist-on ring rotatably mounted to the cap body. The gripper could be magnetic in nature. The detector pair could be mounted outside of the cap body, on the pickup tube or on associated fluid connections. Sonic instead of optical detection means could be used. Venting and/or backfill means could be incorporated into the bottle rather than the cap, or even eliminated. A single optical detector could be implemented, using ambient light or light-emitting fluid as a course. A single optical emitter/detector unit could be implemented, bouncing light off of or through the fluid. The cap and bottle could be combined into a unit,. A number of different materials might be used, singly or in combination, to construct the device, that are compatible with the dispensed fluid. A fluid other than photoresist or primer might be dispensed.

I claim:

1. Apparatus to sense a predetermined level of a fluid being dispensed from a bottle means by a pump, comprising:
    (a) a substantially vertical pickup tube within said bottle means, having a bubble hole located at a preselected point along its length at a corresponding elevation to the predetermined level to be sensed, said pickup tube having a first end immersed in the fluid, so that as said fluid is being pumped out of said bottle means through said pickup tube, said fluid level moves along the outside of said pickup tube and passes said bubble hole, said bubble hole then introducing a bubble into said pickup tube; and
    (b) bubble detection means mounted within said bottle means and at a second end of said pickup tube, to detect said bubble and hence said predetermined level.

2. The apparatus of claim 1, wherein said first end of said pickup tube extends to a bottom-most corner of said bottle means, so that almost all of said fluid can be pumped out of said bottle means, and wherein said bubble hole is located near said first end of said pickup tube so that said predetermined level is a level where said bottle means is practically empty but not so empty that said pickup tube picks up gas voids.

3. The apparatus of claim 1, wherein said fluid is photoresist or photoresist primer.

4. The apparatus of claim 1, further comprising:
    (a) a cap, attached to said second end of said pickup tube, having said fluid pumped through it, having said bubble detection means attached thereto;
    (b) a gripper rotatably attached to said cap, configured to grip a feature of said bottle means, to compressively attach said cap to said bottle means without rotation of said cap, said first end of said pickup tube extending into a mouth of the bottle of said bottle means; and
    (c) a deformable washer, positioned between said cap and said bottle's mouth, to provide a seal while said cap is attached to said bottle means.

5. The apparatus of claim 4, further comprising:
    (a) venting and backfill means in said cap; and
    (b) a threadless seal between said backfill means and said cap.

6. The apparatus of claim 4, wherein said bubble detection means comprises:
    (a) an optical emitter and an optical detector of a certain frequency;
    (b) said emitter and said detector configured to optically communicate across said fluid while it is being pumped through said cap, so that said detector detects a first intensity of light from said emitter when only said fluid is between said detector and said emitter, and so that said detector detects a second intensity of light from said emitter when a bubble is in said fluid between said detector and said emitter.

7. The apparatus of claim 6, wherein said frequency does not cause a reaction in said fluid.

8. The apparatus of claim 6, further comprising:
    (a) a substantially non-opaque and chemically inert outlet tube, located in said cap and positioned between said emitter and said detector, said outlet tube carrying said fluid as it is pumped through said cap from said second end of said pickup tube, to prevent said fluid from contacting said cap, said emitter, and said detector.

9. The apparatus of claim 8, further comprising:
(a) a threadless seal between said pickup tube and said outlet tube.

10. A method to sense a predetermined level of a fluid being dispensed from a bottle means by a pump, comprising the steps of:
(a) providing a substantially vertical pickup tube within said bottle means, having a first end in fluid communication with said pump and having a bubble hole located along its length at a corresponding elevation to the predetermined level to be sensed, said pickup tube having a second end immersed in the fluid, so that when said fluid level moves along the outside of said pickup tube and passes said bubble hole as said fluid is being pumped out through said pickup tube, said bubble hole introduces a bubble into said pickup tube;
(b) providing bubble detection means at said first end of said pickup tube; and
(c) while dispensing, detecting said bubble and hence said predetermined level.

* * * * *

UNITED STATES PATENT AND TRADEMARK OFFICE
CERTIFICATE OF CORRECTION

PATENT NO. : 4,881,487
DATED : November 21, 1989
INVENTOR(S) : Scott E. Moore

It is certified that error appears in the above—identified patent and that said Letters Patent is hereby corrected as shown below:

Column 2, line 55, delete "102" and insert --103--.

Signed and Sealed this

Sixteenth Day of November, 1993

Attest:

BRUCE LEHMAN

*Attesting Officer*  *Commissioner of Patents and Trademarks*